United States Patent [19]

Tairaka et al.

[11] Patent Number: 5,367,050
[45] Date of Patent: Nov. 22, 1994

[54] POLYETHER POLYOL PRODUCTION OF A FLEXIBLE URETHANE FOAM AND SHAPED ARTICLE THEREFROM

[75] Inventors: Yoshihiko Tairaka, Sakai; Mitsuhiro Nishimura, Osaka; Katsuhisa Kodama, Nishinomiya, all of Japan

[73] Assignee: Takeda Chemical Industries, Ltd., Osaka, Japan

[21] Appl. No.: 197,321

[22] Filed: Feb. 16, 1994

Related U.S. Application Data

[62] Division of Ser. No. 141,942, Oct. 28, 1993.

[30] Foreign Application Priority Data

Oct. 28, 1992 [JP] Japan .................. 4-290087

[51] Int. Cl.$^5$ ............................................. C08G 18/50
[52] U.S. Cl. ..................................... 528/423; 544/401
[58] Field of Search ........................ 528/423; 544/401

[56] References Cited

U.S. PATENT DOCUMENTS 3,251,788  5/1966  Currier et al. ................ 260/2.5

Primary Examiner—Maurice J. Welsh
Attorney, Agent, or Firm—Wenderoth, Lind & Ponack

[57] ABSTRACT

A polyether polyol produced by using an N-aminoethylpiperazine-ethylene oxide aduct as an initiator and addition-polymerizing an alkylene oxide thereto and having a molecular weight of about 2000 to 7000; a process for producing a flexible urethane foam starting with the above polyether polyol; a process suited for the production of a hot-cure urethane foam which comprises using the above polyether polyol with a hydroxyl value of 40 to 80 mg KOH/g and, as a blowing agent, 4.6 to 6.0 weight parts of water based on 100 weight parts of the polyol; and a process suited for the production of a cold-cure urethane foam which comprises using the above polyether polyol with a hydroxyl value of 23 to 50 mg KOH/g and, as a blowing agent, 2.5 to 5.0 weight parts of water on the same basis.

The use of the polyether polyol enables the production of a low-density, low-hardness flexible urethane foam using a small amount of water, without requiring any environment-unfriendly chlorofluorocarbon and without being accompanied by deterioration of humid age compression set and other characteristics.

6 Claims, 1 Drawing Sheet

FIG. 1

POLYETHER POLYOL PRODUCTION OF A FLEXIBLE URETHANE FOAM AND SHAPED ARTICLE THEREFROM

This application is a division of application Ser. No. 08/141,942, filed Oct. 28,1993.

FIELD OF THE INVENTION

The present invention relates to a novel polyether and a method for producing a flexible urethane foam starting therewith. The invention specifically provides a method suited for the production of a low-density, low-hardness flexible urethane foam by the hot cure mold process (hereinafter referred to briefly as hot cure process) and a method for the production of a high-resilience urethane foam by the cold cure mold process (hereinafter referred to briefly as cold cure process).

BACKGROUND OF THE INVENTION

Taking advantage of their excellent resiliency, flexible urethane foams have been used as cushioning and back-rest materials in a broad range of applications, such as furniture, bedding, car upholstery and so on. According to the production processes used, such urethane foams are roughly divided into slab foams and mold foams.

A slab foam is available in the shape of a block produced by foaming under no restraint and pieces of the desired shape are cut out from the block for use. A mold foam is a shaped article produced by foaming in a metal or plastic mold. Mold foams are mostly used as automotive parts.

The production technology for such flexible urethane mold foams is generally divided into the cold cure process and the hot cure process. Both processes have their own advantages and disadvantages. Thus, the mold foam produced by the cold cure process is generally known as HR (high resilience) foam and features a high resilience and a large SAG coefficient, for instance, thus being very desirable in physical characteristics. Moreover, this foam can be cured at low temperature in a short cure time as an additional advantage. It is further advantageous in that the foam yield is high and that the foam hardly cracks or shrinks. However, the applications of the foam produced by this process are limited to high-density cushions because reducing the foam density results in drastic aggravation of the humid age compression set.

On the other hand, the hot cure process is disadvantageous in that it requires not only a high curing temperature but also a long cure time and due to a variation in the amount of the catalyst and fluctuations of mold temperature and depending on mold geometry, defects such as cracks, shrinkage and loose skin are liable to develop in the product foam. Moreover, the product yield is also poor. However, the hot cure process is superior to the cold cure process in that the former enables the production of a low-density foam improved in compression set. Therefore, among the flexible urethane foams produced by the hot cure method, low-density foams are generally used as back-rest materials and medium- to high-density foams as cushioning materials.

Thus, the density and hardness of flexible urethane foams should be controlled according to intended applications.

It is common practice to use CFC-11 (trichlorofluorocarbon), which is a controlled chlorofluorocarbon, for inhibiting scorching and avoiding the risk of a fire or for implementing a low degree of hardness in the production of slab foams with a density of not more than 22 kg/cm$^3$ or for controlling the hardness (realizing a low hardness value) and for implementing a low foam density in the production of foams by the hot cure process for use as automotive seat back-rest materials.

However, the recent control over the use of chlorofluorocarbons for the protection of the ozone layer is expected to become more and more stringent and ultimately lead to a complete ban on their use. In view of the imminent complete ban, the development of a technology for producing a low-density, low-hardness urethane foam without employing a chlorofluorocarbon is an urgent task to be tackled. The approaches so far made to this end generally comprise a switchover from CFC-11 to $CH_2Cl_2$ and the use of an increased amount of water in the formulation. On the other hand, as to mold foams, the polyol is modified and the amount of water in the batch formula is increased to reduce chlorofluorocarbon requirements. Regarding the hot cure process, technologies for producing a low-density, low-hardness urethane foam which comprise using water alone as the blowing agent and increasing the pouring temperature beyond the conventional level have been disclosed in Japanese Tokkyo Kokai Koho H-3-176110, H-3-192109, H-2-11614 and H-3-3689, among others. However, unlike the case using a chlorofluorocarbon, it is difficult to produce a low-hardness flexible foam having satisfactory physical characteristics by using water alone as the blowing agent. To overcome this difficulty, a method employing a monool or diol-based polyoxyalkylene polyol as part of the polyol component has been proposed but this method has the drawback that the humid age compression set is increased and other physical properties are also sacrificed.

However, increasing the amount of water in the formulation causes an increased evolution of carbon dioxide gas according to the reaction $-NCO + H_2O \rightarrow \sim NH_2 + CO_2$ and although the $CO_2$ gas contributes to foaming, of course, it encourages the crosslinking reaction as follows.

This crosslinking reaction and hydrogen bonding between the resulting urea bonds unavoidably increase the hardness of the product foam. Therefore, when a urethane foam of a given density is produced by increasing the amount of water instead of using CFC-11, a substantial increase occurs in the hardness of the foam. Furthermore, the use of water in an increased quantity adversely affects physical properties including compression set in a considerable measure. Modifying the polyol may result in some improvement in compression set but be scarcely effective in controlling the increase of hardness.

When the urethane foam is intended for use as the back rest of a car seat, such an increased hardness is definitely unacceptable. Since a reduction in chlorofluorocarbon consumption is an urgent requirement today, a certain increase in hardness is tolerated today but the demand for reduced hardness is persistent.

It is true that the following methods for reducing the hardness of foams have been known for years. One of the methods comprises lowering the NCO index (isocyanate indicator) [the equivalent number of isocyanate groups per 100 active hydrogen atoms; —NCO and —OH/H₂O are in the ratio of 1:1 at the NCO index number of 100] of the reaction system and the other comprises adding a monohydric or dihydric alcohol to lower the functionality of the polyol component.

However, these known methods have major disadvantages such as poor moldability, undercure and poor physical characteristics of the foam (particularly humid age compression set).

On the other hand, by virtue of their satisfactory physical properties, HR foams are meeting an increasing portion of the demand but its greatest drawback is that this kind of foam cannot be easily reduced in density as compared with the hot cure mold foam.

It is, therefore, a further object of the present invention to provide a process for producing an HR foam of low density and low hardness without sacrificing the physical properties, particularly humid age compression set, of the foam and with acceptable moldability.

Among the HR formulation recently proposed, there is the formula called "all-MDI formula" employing some special MDI.

This type of formula offers a number of advantages such as high cure rate, high durability, ease of varying hardness, etc. and the demand for the foams produced from this type of formula is increasing.

However, this type of formula is hardly conducive to hardness reduction in the absence of CFC-11 and, in the domestic market, is claiming only a limited segment of the market, typically the head rest market, where foams of comparatively high density are still acceptable.

The all-MDI foam cannot be reduced in density to the extent that can be obtained with TDI-80 and TM-20 (TDI-80/polymeric MDI=80/20) but is also required to be supplied in the low density range.

On a laboratory scale, it is not impossible to produce a low-density HR foam by no more than increasing the amount of blowing agent water. However, the humid age compression set characteristic of the foam deteriorates drastically in proportion to the increasing amount of H₂O, with an associated aggravation of foam moldability. In other words, such a system is not suited for the production of foams of intricate design.

The object of the present invention is to solve the above-mentioned problems associated with the production of low-density, low-hardness flexible urethane foams.

More particularly, the object of the invention is to provide a process for producing a low-density, low-hardness flexible urethane foam without employing a controlled chlorofluorocarbon and, instead, using water substantially alone as a blowing agent. The further primary object of the invention is to create a novel polyether polyol for the establishment of an environment-friendly production technology and provide a novel process for producing a flexible urethane foam starting with such a specially created polyether polyol as part of the polyol component, which process does not necessarily require the use of a chlorofluorocarbon.

SUMMARY OF THE INVENTION

The inventors of the present invention found, after a great deal of research endeavor to improve the starting material polyether polyol, which is known to have a profound influence on the moldability and physical properties, in particular, of a flexible urethane foam, that a polyether polyol having a specific structure, shown below, acts in a unique way in the production system for a urethane foam which employs water as a principal blowing agent. This finding was followed by further research, which has culminated in the development of the present invention.

It is, therefore, an object of the invention to provide a polyether polyol produced by addition-polymerizing an alkylene oxide to an N-aminoethylpiperazine-ethylene oxide adduct as a polymerization initiator and having a molecular weight of 2000 to 7000.

It is another object of the invention to provide a process for producing a flexible urethane foam characterized by reacting a polyol comprising the polyether polyol with an organic polyisocyanate in the presence of a surfactant and a blowing agent.

BRIEF DESCRIPTION OF THE DRAWING

In FIG. 1. ● denotes the foam of Example 6, ◆ the foam of Example 7, and x the foam of comparative Example 9.

DETAILED DESCRIPTION OF THE INVENTION

The N-aminoethylpiperazine-ethylene oxide adduct, prior to the addition polymerization of alkylene oxide, includes the structure of the following formula (hereinafter referred to as APE structure).

The alkylene oxide (oxyalkylene unit; hereinafter referred to as alkylene oxide) to be addition-polymerized is preferably ethylene oxide (oxyethylene) and/or propylene oxide (oxypropylene). In this connection, ethylene oxide and propylene oxide units may occur in a random arrangement or in blocks.

wherein W, X and Y independently mean wherein $R^1$ and $R^2$ independently represent H or $CH_3$; m and n are $35 \leq m+n \leq 150$; the number being that which is necessary to satisfy the molecular weight condition of 2000–7000.

The polyether polyol of the invention may be any polyether polyol having the above APE structure and may also be a polymer polyol based on a polyether polyol having this structure.

The polyether polyol of the invention (hereinafter referred to sometimes as APE polyol) preferably has a molecular weight of not less than 2000. With an APE polyol having a molecular weight of less than 2000, it is difficult to provide a flexible urethane foam. Generally, an APE polyether polyol with a molecular weight not exceeding 7000 is employed. Regarding the remainder of the polyol structure, the preferred polyol has

(oxyethylene group; hereinafter referred to sometimes as ethylene oxide or EO) and

(oxypropylene group; hereinafter referred to sometimes as propylene oxide or PO). The EO and PO may occur in any desired combination. Thus, the combination may be random, for instance. The proportion of oxyethylene (ethylene oxide) units is preferably not more than 20%. If the proportion of oxyethylene be too great, it would be difficult to produce a foam or, for that matter, a satisfactory flexible foam.

The oxyethylene units at the terminals of the polyol molecule are useful for the formation of terminal primary —OH radicals but the availability of too many —OH radicals tends to yield a closed-cell foam, instead of giving a satisfactory flexible foam. Therefore, the oxyethylene units directly bound to the terminal hydrogen atoms preferably account for not more than 15% in the polyol molecular weight range of more than 4000 and not more than 10% in the polyol molecular weight range of 2000 to 4000.

A polyether polyol having the above-mentioned structure can be synthesized by the known processes or any process analogous thereto. Generally, the following routes of synthesis can be utilized.

(aminoethylpiperazine) is heated in a $N_2$ stream and at least 2 molar equivalents of ethylene oxide (OE) are added to give

[referred to as APE-H structure; the APE structure mentioned earlier corresponds to this APE-H structure after elimination of hydrogen atoms).

When the amount of EO so added is 3 molar equivalents or greater, stoichiometrically the whole polyether has APE-H and APE structures but even when the amount is at least 2 molar equivalents, APE-H is included in the reaction product.

To the APE-H or APE-H-containing reaction mixture thus obtained is added KOH and the mixture is dehydrated. This operation is performed to cause the reaction $KOH + \sim OH \sim OK + H_2O$.

This operation is also intended to inhibit formation of the following byproduct diol from the KOH catalyst.

Depending on uses for the polyol, the presence of the byproduct diol may be tolerated.

The dehydration can be performed generally by heating the system to 100° to 130° C. and bubbling an inert gas such as $N_2$ through the system, by heating the system under reduced pressure or by azeotropic distillation with toluene. The proper amount of KOH is 0.1 to 0.4% based on the final reaction product. As the catalyst, NaOH or the like can be used in lieu of KOH.

Then, EO (ethylene oxide) or PO (propylene oxide) is added and reacted at a temperature in the neighborhood of 100° to 120° C. The amount of EO and/or PO so added should of course be selected according to the desired molecular weight of the final product.

After addition of PO or EO in the amount corresponding to the desired molecular weight (hydroxyl value), the catalyst KOH is inactivated by addition of an acid such as diluted hydrochloric acid, dilute sulfuric acid or phosphoric acid or an alkaline adsorbent such as synthetic magnesium silicate or by addition of both. The reaction mixture is then filtered to remove insolubles and the excess water is removed by decompression or bubbling an inert gas. Generally, this dehydration is carried out until a water content of not more than 0.05% is attained. For the ease of maintaining the stability of the product polyether polyol, it is common practice to add at least about 500 to 1000 ppm of BHT (2,6-di-tert-butyl-4methylphenol).

The above procedure provides a polyether polyol of the present invention.

In the production of a flexible urethane foam according to the invention, a filled polyol (a so-called polymer polyol) obtainable by polymerizing an ethylenically unsaturated monomer such as styrene and/or acrylonitrile in the presence of a radical polymerization initiator in the above polyether polyol can be employed. The resulting polymer of the monomer is partially grafted to the polyether chain at times but is mostly dispersed in a stable condition in the polyether polyol.

The polyether polyol of the invention, thus produced, can then be used in the production of a flexible urethane foam.

The production of a flexible urethane foam starting with the polyether polyol of the invention can be carried out in the per se conventional manner.

The polyol comprising the polyether polyol of the invention is reacted with an organic polyisocyanate in the presence of a surfactant and a blowing agent, with or without addition of a catalyst, flame retardant, stabilizer, colorant, etc., to synthesize a flexible urethane foam.

As the polyol, the APE polyether polyol of the invention can be used alone or in admixture with a commercial polyether polyol. In consideration of the ease of handling, the use of a blend with a commercial polyol is preferred. The hydroxyl value of the blend polyol is preferably about 20 to 80 mg KOH/g. As to the catalyst, surfactant, etc., commercial products can be employed.

As the blowing agent, $H_2O$ is primarily employed but a low-boiling organic substance such as $CH_2Cl_2$, CFC-11 or HCFC-141b can be additionally employed. The organic polyisocyanate which can be used includes tolylene diisocyanate (TDI), diphenylmethane diisocyanate (MDI), modified MDI, polyphenylpolymethylene polyisocyanate (polymeric MDI), etc. as well as mixtures thereof.

The proportion of the organic polyisocyanate is generally about 0.8 to 1.5 equivalents based on the OH of the polyol and $H_2O$.

The polyether polyol can be used in the production of whichever of a slab foam and a mold foam.

The further object of the invention is to provide a process for producing a flexible urethane foam starting with the above APE polyether polyol of the invention.

The present invention is, therefore, directed to a process for producing a flexible urethane foam characterized by reacting a polyether polyol prepared.

The process is particularly suited for the production of a hot cure flexible urethane foam of low density and low hardness, comprises (i) using an aminoethylpiperazine-ethylene oxide adduct of the above-mentioned APE structure as the initiator and addition-polymerizing an alkylene oxide thereto and having a hydroxyl value of 40 to 80 mg KOH/g as part of the polyol component and (ii) reacting it with an organic polyisocyanate in the presence of 4.0 to 6.0 parts by weight of water based on 100 parts by weight of the polyol component.

As mentioned above, a flexible urethane foam is generally manufactured using the polyol, organic polyisocyanate, cell size regulator, blowing agent and, optionally, catalyst, flame retardant, color and other additives.

While this process of the invention is characterized in that a polyether polyol of the above-described APE structure is employed, the ethylene oxide content of the polyether polyol to be used is preferably not more than 20%. If the EO content is too large, it becomes difficult to provide a satisfactory open-cell foam. The ethylene oxide units added to the terminals of the molecule preferably account for not more than 10% based on the total polyol.

This is because the use of EO in excess tends to cause a closed-cell structure.

The whole amount of the polyol may be provided by the polyether polyol of the invention. However, since the reaction then proceeds very rapidly, the use of a commensurate reaction vessel is recommended. When a conventional reactor is employed, it is preferable to use a blend of not more than 40% of the APE polyether polyol and the balance of other polyol or polyols. However, if the proportion of the APE polyether polyol is less than 5%, the effects of the invention will not be fully materialized.

The other polyol which can be used in combination may be any known polyol having a hydroxyl value of 40 to 80 mg KOH/g and the use of a commercial polyol for hot cure use leads to better results. For example, Actcol MF-26, MF-53 and MF-67, all available from Takeda Chemical Industries, Ltd., can be mentioned.

The hydroxyl value of the blend polyol is preferably about 45 to 75 mg KOH/g, and the proportion of terminal primary OH groups is preferably 55% or less and, for still better results, 30% or more.

If the hydroxyl value is too large, foam stability is sacrificed to make it difficult to provide a satisfactory foam. Conversely, if the OH value is too small, the physical properties, particularly humid age compression set, of the foam are adversely affected.

On the other hand, too large a proportion of terminal primary OH groups tends to encourage the formation of a closed-cell foam. Conversely, if the proportion is too small, curability is sacrificed, although a foam is obtained at any rate. However, in consideration of productivity, the proportion of terminal primary OH groups is preferably 30% or more.

The organic polyisocyanate to be used in the process of the invention is preferably tolylene diisocyanate (hereinafter referred to as TDI) and more preferably TDI-80 (Takenate 80:2,4-TDI/2,6-TDI=80/20; Takeda Chemical Industries).

In the process of the invention, the above-described polyol and organic polyisocyanate are used in the isocyanate index range of 80 to 120. If the isocyanate index value is less than 80, the physical properties such as humid age compression set of the foam tends to be sacrificed. On the other hand, when the isocyanate index exceeds 120, curability is sacrificed and the hardness of the foam is also compromised.

In this process of the invention, water alone is used as the blowing agent. The amount of water should be in the range of 4 to 6 parts by weight based on 100 parts by weight of the polyol used. If the amount of water is less than 4 parts by weight, the foam density is increased so that the objective low-density foam cannot be obtained. However, if more than 6 parts by weight of water is employed, the objective low-hardness flexible foam cannot be obtained.

An amine catalyst is not essential to the process of the invention but can be used in the amount generally employed. The amine catalyst may for example be triethylenediamine (TEDA), pentamethyldiethylenetriamine, N-ethylmorpholine or the like. Preferably, a tin catalyst such as stannous octoate is used concomitantly.

It should be understood that the catalyst which can be used in the practice of the invention is not limited to the species mentioned above.

The surfactant which can be used may be any of the surfactants for slab foams and those for hot cure mold foams. Among such surfactants are B-8017, B-2370 (both available from Goldschmidt), L-582, L-5740M, L-5740 S (all available from Nippon Unicar), SH-190 and SRX-293 (both available from Toray Silicone). Such surfactant is generally used in a proportion of 0.5 to 2 parts by weight based on 100 parts by weight of the polyol.

Furthermore, depending on the required characteristics of the product flexible foam, a flame retardant such as tris(2,3-dichloropropyl) phosphate, halogen-containing condensed organic phosphoric esters (e.g. CR 505 available from Daihachi Chemical Industries) etc., colorant, antioxidant, viscosity reducing agent such as propylene carbonate, and other known additives that may be suitable can also be added.

In the production of a flexible urethane foam by this hot cure process, curing is carried out at a temperature over 100° C. and preferably within the range of 100° C. to 200° C.

The process also, particularly suited for the production of an HR foam, comprises (i) using a polyol comprising an APE polyether polyol prepared by using an aminoethylpiperazine-ethylene oxide adduct as an initiator and addition-polymerizing an alkylene oxide thereto and said polyether polyol having a hydroxyl value of 23 to 50 mg KOH/g and (ii) water as a blowing agent in a proportion of 2.5 to 5.0 parts by weight to each 100 parts by weight of the polyol to provide a high-resilience urethane foam.

The polyol which can be used in this process of the invention is preferably an APE polyether polyol with a hydroxyl value of 23 to 50 mg KOH/g. If the hydroxyl value exceeds 50, the foaming reaction tends to give a closed-cell structure so that a satisfactory HR foam cannot be obtained.

On the other hand, an APE polyether polyol with a hydroxyl value of less than 23 cannot be easily produced by the usual production procedure.

The amount of said APE polyether polyol is preferably not less than 30%. If the amount of said APE polyol is less than 30%, no sufficient effect will be realized.

In the process of the invention, the above APE polyol can be used in combination with a commercial polyol. Any commercial polyol can be used for this purpose but it is preferable to see to it that the hydroxyl value of the polyol blend will be in the range of 23 to 45 mg KOH/g. A polyol blend with a hydroxyl value of less than 23 is hardly available, while the use of a polyol blend with a hydroxyl value of more than 45 does not provide a satisfactory foam.

The polyol which can be advantageously used concomitantly includes, inter alia, Actcol GE-3412 (OH value 34, viscosity 950 mPa.s) , MF-81 (35 and 1100 respectively), MF-83 (35 and 950, respectively), MF-85 (28 and 1400, respectively), POP-28 (polymer polyol, OH value 28, viscosity 2800) and POP-18 (polymer polyol, OH value 30, viscosity 2000).

The APE polyol is preferably a polyol prepared by addition-polymerizing propylene oxide and/or ethylene oxide, with ethylene oxide accounting for 5 to 25%. Among them, one having a terminal ethylene oxide content of 5 to 20% is preferred. If the ethylene oxide content is too large, an open-cell HR foam having a satisfactory cushioning property can hardly be obtained. Conversely, when the EO content is too low, a satisfactory foam may not be obtained.

The amount of water for use as a blowing agent in accordance with the invention is 2.5 to 5.0 parts by weight. If the amount of water is less than 2.5 parts by weight, a low density foam cannot be obtained in any event and, therefore, it is futile to employ the specified polyol. If the amount of water is more than 5.0 parts by weight, the foam density will become too low and no adequate physical characteristics be realized.

While water can be a sole blowing agent, the use of a low-boiling organic substance such as CFC-11, HCFC-141b or the like as an auxiliary blowing agent is permissible.

The surfactant for use in the above production process of the invention may be any foam stabilizer for HR foams. Among such surfactants are B-4113, B-4690, B-8650 (all available from Goldschmidt), L-5305, L-3600, SZ-1313 (all available from Nippon Unicar), SRX-274C, SF-2962 (both available from Toray-Dow Corning) and so on. The amount of such cell size regulator is generally 0.5 to 2 parts by weight based on 100 parts by weight of the polyol.

The catalyst which can be used in this process of the invention may be any of those available commercially for the production of urethane foams. Thus, for example, tertiary amines such as triethylenediamine (TEDA) and tetramethylhexanediamine (TMHDA) can be mentioned. However, if a sufficient reaction rate can be achieved, such a catalyst need not be employed.

A crosslinking agent is sometimes used in the production of HR foams. The crosslinking agent includes, among others, low molecular compounds such as ethylene glycol, glyerine, etc., aminoalcohols such as monoethanolamine, diethanolamine, etc., and polyether polyols having a hydroxyl value of not less than 400, e.g. an ethylenediamine-PO adduct.

If necessary, a flame retardant, a colorant and other additives can be added.

The organic polyisocyanate for use in this process includes, among others, tolylene diisocyanate (hereinafter referred to as TDI), 2,4' and/or 4,4'-diphenylmethane diisocyanate (MDI), their modification products, their prepolymers with polyols, polyphenylpolymethylene polyisocyanate (hereinafter referred to as polymeric MDI), and mixtures of such polyisocyanates.

In this process of the invention, too, said polyol, $H_2O$ and organic polyisocyanate are used in a formulation giving an isocyanate index (hereinafter referred to as NCO index) of 80 to 120. If the isocyanate index is less than 80, the physical properties, such as humid age compression set, of the foam tend to be sacrificed. Conversely if the isocyanate index exceeds 120, scorching tends to occur and the foam will be unsatisfactory in hardness and other parameters.

In the above process, the materials other than the organic isocyanate are premixed beforehand and this premix is admixed with the isocyanate in a high-speed mixer for several seconds. For production on a commercial scale, it is advantageous to use a foaming machine for mixing.

For the production of an HR foam by the cold cure process, curing is carried out preferably at a temperature between 30° and 80° C. and more preferably between 50° and 70° C.

The present invention provides the following effects. Thus, with the polyol of the invention (inclusive of its use as part of the polyol component), the following remarkable effects are obtained.

(1) The 25% ILD (compressive hardness JIS-K6401) value can be decreased, by 2 kg or more, without affecting the compression set.

(2) In the production of the so-called mold foam, the water requirements can be decreased. Thus, when the foaming reaction is carried out with the same amount of water, the use of the polyol of the invention provides for a foam of lower density. Thus, the foaming efficiency is considerably improved.

(3) The amount of the amine catalyst which is used in the production of foams can be reduced or even the catalyst can be substantially dispensed with. While an amine catalyst is generally required for the production of foams, it is well known that the residual amine catalyst in foams can be a cause of discoloration and degradation. In this respect, too, the polyol of the invention has a unique advantage.

The foam produced by the process of the invention has the following characteristics.

(1) Environment-unfriendly chlorofluorocarbons such as CFC-11 need not be employed.

(2) The hardness of product foams can be decreased without affecting their other physical properties (particularly humid age compression set).

(3) In the production of foams, the water requirements can be decreased. Therefore, foams can be provided at a reduced cost and the problems (in feeling, hardness, permanent strain, etc.) associated with the use of water in a large amount can be eliminated.

EXAMPLES

The following examples, comparative examples and reference examples are intended to describe the present invention in further detail and should by no means be interpreted as defining the scope of the invention.

Example 1

A reactor equipped with heater and stirrer means is charged with 2.7 kg (20.9 moles) of aminoethylpiperazine and the internal atmosphere is replaced with $N_2$ gas. The charge is heated to 120° C. and 2.76 kg (62.7 moles) of ethylene oxide is added for addition polymerization. This reaction provides an aminoethylpiperazine-3EO adduct (the structure of the invention).

Then, 150 g of KOH flakes are added and $N_2$ gas is bubbled through the reaction mixture. After dehydration to a water content of not more than 0.1%, 57.0 kg of propylene oxide is introduced at 105°–115° C. and, then, 3.3 kg (5% in the polyol) of ethylene oxide is introduced for further reaction.

After completion of the reaction, a small quantity of water and synthetic magnesium silicate (KYOWAAD 600, the trademark of Kyowa Chemical Co.) are added for adsorption of potassium hydroxide. The mixture is then filtered to remove insolubles, followed by dehydration to a moisture content of not more than 0.05%. Then, 65 g of BHT (2,6-di-tert-butyl-4-methylphenol (available from Yoshitomi Pharmaceutical) is added.

The polyol A thus synthesized has a hydroxyl value of 63.5 mg KOH/g and a viscosity of 610 mPa.s (25° C.). This polyol contains 5% of oxyethylene and 8.3% of APE (% by weight).

Example 2

The same reactor as the one used in Example 1 is charged with 2.72 kg of an aminoethylpiperazine-3EO adduct separately synthesized and 150 g of KOH flakes are added.

Thereafter, 52.3 kg of propylene oxide is introduced for addition polymerization and, then, 7.5 kg of ethylene oxide was further introduced. The reaction mixture is neutralized and purified as in Example 1, followed by addition of 63 g of BHT to provide a polyol B.

This polyol B has a hydroxyl value of 35.8 mg KOH/g, a viscosity of 930 mPa.s (25° C.), an oxyethylene content of 12% and an AEP structure content of 4.3%.

Example 3

A 5-liter autoclave is charged with 750 g of polyol B and after repeated nitrogen purging, a premix of 3250 g of polyol B, 500 g of acrylonitrile, 500 g of styrene monomer and 30 g of AIBN is introduced at 120° C. with constant stirring over 3 hours. The unreacted monomers are removed under reduced pressure to provide a polymer polyol. This polymer polyol has an OH value of 27.5 mg KOH/g and a viscosity of 2440 mPa.s (25° C.) (polyol C).

Comparative Example 1

Using the same reactor as the one employed in Example 1 and by the same procedure as Example 1, polyol D is synthesized. Thus, 3.76 kg (64.5 moles) of propylene oxide is added to 2.77 kg (21.5 moles) of aminoethylpiperazine and after addition of 150 g of KOH flakes and dehydration, 0.58 kg (10 moles) of propylene oxide is added. By this addition of PO, an oxypropylene unit is added to every —NH group of the aminoethylpiperazine and, therefore, no APE structure is present in this polyol. (Therefore, this polyol is not the polyol of the invention).

Thereafter, 1.89 kg of ethylene oxide is added and, then, 51.0 kg of propylene oxide is added, followed by further addition of 3.2 kg of ethylene oxide (5.1% terminal oxyethylene content). The reaction mixture is treated with synthetic magnesium silicate to adsorb KOH and filtered. Then, 63 g of BHT is added.

The resulting polyol D has a hydroxyl value of 62.4 mg KOH/g and a viscosity of 560 mPa.s (25° C.).

This polyol has an APE content of 0 and an oxyethylene content of 8.1%, which includes a terminal EO content of 5.1%.

Comparative Example 2

A reactor is charged with 3.17 kg of triethanolamine and 150 g of KOH flakes and, then, 2.7 kg of ethylene oxide is added. After dehydration, 52.0 kg of propylene oxide is added. Then, 3 kg of ethylene oxide is further added and after neutralization and purification, 61 g of BHT is added, whereby a polyol E is obtained. This polyol E has a hydroxyl value of 56.3 mg KOH/g, a viscosity of 480 mPa.s, and an oxyethylene content of 9.3% which includes a terminal EO content of 4.9%. Of course, its APE content is 0. Examples 4 and 5, and Comparative Examples 3 through 8

Using the formulations shown in Table 1, flexible urethane foams are produced by the hand mixing method. In the table, Ex. 1, Comp. Ex. 1, etc. mean Example 1, Comparative Example 1, etc. Thus, surfactant, catalyst and other additives are added to 200 g of each polyol beforehand and stannous octoate is added to the premix. To this is quickly added TDI-80 (Takenate 80, Takeda Chemical Industries) and the mixture is agitated on a mixer for 5 seconds. This composition is poured into an aluminum mold, 320×320×70 mm, which has been preheated to a temperature of 40°±1° C. After foaming, the product is post-cured in a curing oven at 180° C. for 12 minutes. The physical properties of the product foam are shown in Table 1. This process is the so-called hot cure mold process. Among the mold foams according to Example 4 and Comparative Examples 3, 4 and 6 in which the same amount of water is employed, the foam density in Example 4 is remarkably lower. In order to obtain a foam of the same density as that of the foam of Example 4, not less than 5.7 parts of $H_2O$ is required as in Comparative Example 7.

To achieve the density value of Comparative Example 3 using the polyol of Example 1, the $H_2O$ requirement is not more than 4.7 parts. The effect of the polyol of Example 1 on foam density is remarkable. On the other hand, the hardness values (25% ILD) of the foams according to Examples 4 and 5 are both as low as not more than 10.0 kg.

In a foaming operation by the hand mixing method, it is extremely difficult to produce a foam with a hardness value of the order of 10 kg while insuring a humid age compression set of not more than 15%. However, as demonstrated in Example 3, such a foam can be easily produced when the polyol of the invention is employed. Actcol MF-53, which is a commercially available substitute for chlorofluorocarbons, gives a foam with a density of 35.4 kg/m² and a 25% ILD hardness of 13.5 kg with the same amount of blowing agent, indicating that the foam of Example 3 is remarkably superior.

To attain a foam density of about 35 kg/m³, the polyol of Example 1 requires no more than about 4.7 parts of H₂O as demonstrated in Example 5 and the 25% ILD value of the foam is less than 10 kg. The effect of this Example 2 is also remarkable.

Comparative Examples 4 and 5 employ the polyol of Comparative Example 1. The polyol of Comparative Example 1 is structurally similar to the polyol of Example 1 but is not a polyol prepared using aminoethylpiperazine-EO adduct as the initiator.

As apparent from Table 1, there is a marked difference between Example 4 and Comparative Example 4.

The foam of Comparative Example 8 is a low-hardness, low-density flexible foam prepared using CFC-11. Many attempts have so far been made to attain these physical properties. The properties of the foams of Examples 4 and 5 are not inferior to those properties.

By the present invention, the object of saving on the consumption of chlorofluorocarbons in the hot cure process has been thoroughly accomplished.

Based on the above results, it is clear that the flexible urethane foam starting with the polyol of the invention has excellent characteristics and that the polyol of the invention is of great use.

TABLE 1

|  | Ex. 4 | Ex. 5 | Comp. Ex. 3 | Comp. Ex. 4 | Com. Ex. 5 | Comp. Ex. 6 | Comp. Ex. 7 | Comp. Ex. 8 |
|---|---|---|---|---|---|---|---|---|
| Actcol MF-53[(1)] | 75 | 75 | 100 | 75 | 75 | 75 | 100 | 100 |
| Polyol of Example 1 | 25 | 25 | — | — | — | — | — | — |
| Polyol of Comp. Ex. 1 | — | — | — | 25 | 25 | — | — | — |
| Polyol of Comp. Ex. 2 | — | — | — | — | — | 25 | — | — |
| CR-505[(2)] | 10 | 10 | 10 | 10 | 10 | 10 | 10 | 10 |
| H₂O | 5.3 | 4.7 | 5.3 | 5.3 | 5.0 | 5.3 | 5.7 | 4.5 |
| TEDA[(3)] | — | — | 0.1 | — | — | — | 0.1 | 0.1 |
| Stannous octoate | 0.07 | 0.07 | 0.07 | 0.07 | 0.08 | 0.07 | 0.07 | 0.10 |
| L-5740M[(4)] | 1.0 | 1.0 | 1.0 | 1.0 | 1.0 | 1.0 | 1.0 | 1.0 |
| Takenate 80 | 61.8 | 56.0 | 62.1 | 61.8 | 58.9 | 61.8 | 66.0 | 52.3 |
| Isocyanate index | 100 | 100 | 100 | 100 | 100 | 100 | 100 | 100 |
| CFC-11 |  |  |  |  |  |  |  | 10 |
| [Freerise foaming] |  |  |  |  |  |  |  |  |
| Rise time, min.-sec. | 1-13 | 1-16 | 1-29 | 1-25 | 1-30 | 2-00 | 1-18 | 1-40 |
| Free density kg/m³ | 24.3 | 26.5 | 24.3 | 24.1 | 25.3 | 24.0 | 22.3 | 22.3 |
| Appearance |  |  |  |  |  | No good foam obtained |  |  |
| [Mold foaming] |  |  |  |  |  |  |  |  |
| Overall density kg/m³ | 30.4 | 34.2 | 35.4 | 32.4 | 34.4 | 33.4 | 32.5 | 33.2 |
| Actcol MF-53[(1)] | 75 | 75 | 100 | 75 | 75 | 75 | 100 | 100 |
| Core density kg/m³ | 26.3 | 28.2 | 26.8 | 26.3 | 27.3 | 26.6 | 25.4 | 25.5 |
| 25% ILD kg314 cm² | 9.5 | 10.0 | 13.5 | 11.4 | 11.8 | 13.0 | 12.7 | 10.8 |
| Ball Rebound (%) | 41 | 42 | 38 | 40 | 41 | 40 | 40 | 41 |
| Air permeability cm³/cm² · sec | 70.4 | 54.5 | 21.8 | 48.2 | 20.6 | 53.8 | 63.8 | 28.3 |
| Tensile strength kg/cm² | 1.38 | 1.30 | 1.29 | 1.30 | 1.21 | 1.38 | 1.53 | 1.00 |
| Elongation (%) | 138 | 133 | 148 | 138 | 130 | 135 | 176 | 144 |
| Tear resistance kg/cm | 0.86 | 0.86 | 0.95 | 0.83 | 0.78 | 0.86 | 1.18 | 0.69 |
| Compession Set |  |  |  |  |  |  |  |  |
| 70° C. × 22 hr (50 compression) % | 10.7 | 9.8 | 13.0 | 12.8 | 12.7 | 13.8 | 13.4 | 9.8 |
| 50° · 95% (humid) × 22 hr (50% compression) % | 12.3 | 11.4 | 16.3 | 17.3 | 16.8 | 17.7 | 19.3 | 15.8 |

[(1)]Manufactured by Takeda Chemical Industries; OH value 70.0 mg KOH/g, viscosity 450 mPa · s.
[(2)]Flame retardant manufactured by Daihachi Chemical Industries.
[(3)]Catalyst manufactured by Tosoh corp.
[(4)]Silicone surfactant manufactured by Nippon Unicar.
Examples 6-1 ~ 6-3, 7-1, 7-2, and Comparative Examples 9-1 ~ 9-3.

Table 2 shows a comparison of data generated with various polyols for HR foams.

Using the various formulations shown in Table 2, HR foams are produced by the hand mixing method. Thus, each polyol, catalyst, surfactant, crosslinking agent and water are admixed to provide a premix. A suitable amount of the premix is taken and formulated with the polyisocyanate so as to give an isocyanate index of 100 (e.g. premix/TM-20=100/43.5 in Examples 6 and 7 and Comparative Example 8) and the mixture is stirred with a mixer for 5 seconds. The resulting composition is poured into an aluminum mold, 400×400×100 mm, which has been heated to 60°-70° C. and cured in situ at the same temperature for 7 minutes. The foam is taken out from the mold and crushed. The sample is allowed to stand for at least 1 day and its physical properties are determined. Foams of varying density are produced by varying the pouring volume.

Figure 1:
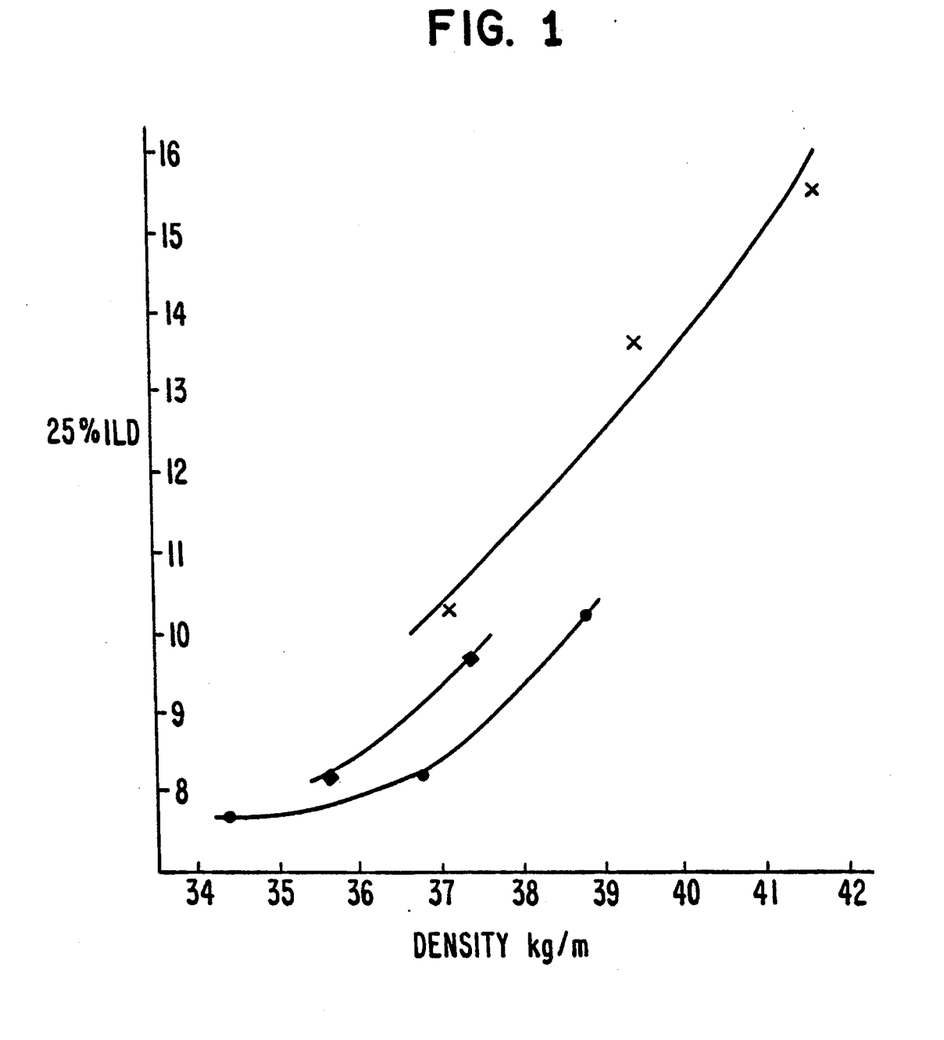
FIG. 1 shows the relationship between density and hardness for the HR foams obtained in Examples 6 and 7 and Comparative Example 9.

The hardness of an HR foam depends on foam density. FIG. 1 shows the relationship between density and 25% ILD. The absence of density plots less than 37 kg/m³ for Comparative Example 9 indicates that no sufficient density reduction can be achieved with the polyol used in Comparative Example 9.

The density—and hardness—reducing effects of the polyol used in Examples 2 and 3 are evident.

These foams also clear the humid age compression set test of ≦20%, with a definite difference from the foams of Comparative Examples.

A foam of the same density as that of Comparative Example 10 can be provided, as in Example 9, even at a reduced $H_2O$ level of 3.0 parts.

TABLE 2

|  | Ex. 6-1 | Ex. 6-2 | Ex. 6-3 | Ex. 7-1 | Ex. 7-2 | Comp. Ex. 9-1 | Comp. Ex. 9-2 | Comp. Ex. 9-3 |
|---|---|---|---|---|---|---|---|---|
| Formulation |  |  |  |  |  |  |  |  |
| Polyol of Example 2 | 60 | 60 | 60 | — | — |  |  |  |
| Polyol of Example 3 | — | — | — | 50 | 50 |  |  |  |
| Actcol · GE-3412[5] | — | — | — | 50 | 50 | 60 | 60 | 60 |
| Actcol · POP-18[6] | 40 | 40 | 40 | — | — | 40 | 40 | 40 |
| SRX-274C[7] | 1.0 | 1.0 | 1.0 | 1.0 | 1.0 | 1.0 | 1.0 | 1.0 |
| TEDA L-33[8] | 1.0 | 1.0 | 1.0 | 1.0 | 1.0 | 1.0 | 1.0 | 1.0 |
| $H_2O$ | 3.6 | 3.6 | 3.6 | 3.6 | 3.6 | 3.6 | 3.6 | 3.6 |
| Actcol ST-700[9] | 2.5 | 2.5 | 2.5 | 2.5 | 2.5 | 2.5 | 2.5 | 2.5 |
| Diethanolamine | 1.0 | 1.0 | 1.0 | 1.0 | 1.0 | 1.0 | 1.0 | 1.0 |
| TM-20[10] | 47.5 | 47.5 | 47.5 | 47.6 | 47.6 | 47.5 | 47.5 | 47.5 |
| Isocyanate index | 100 | 100 | 100 | 100 | 100 | 100 | 100 | 100 |
| Physial properties of molded foam |  |  |  |  |  |  |  |  |
| Overall density kg/m³ | 34.4 | 36.8 | 38.8 | 35.6 | 37.4 | 37.1 | 39.4 | 41.9 |
| Core density kg/m³ | 29.8 | 31.2 | 37.7 | 30.5 | 34.7 | 31.2 | 33.7 | 36.3 |
| 25% ILD kg/314 cm² | 7.7 | 8.2 | 10.2 | 8.2 | 9.7 | 10.3 | 13.3 | 15.8 |
| Ball Rebound (%) | 56 | 56 | 55 | 58 | 57 | 63 | 65 | 65 |
| Air permeability | 48 | 30 | 40 | 58 | 53 | 83 | 70 | 60 |
| Tensile strength kg/cm² | 1.52 | 1.34 | 1.39 | 1.37 | 1.35 | 1.06 | 1.13 | 1.37 |
| Elongation (%) | 110 | 110 | 114 | 111 | 115 | 110 | 101 | 108 |
| Tear resistance kg/cm | 0.60 | 0.63 | 0.71 | 0.58 | 0.63 | 0.47 | 0.54 | 0.58 |
| Compression Set |  |  |  |  |  |  |  |  |
| 70° C. × 22 hr % | 8.3 | 8.7 | 8.4 | 8.5 | 8.9 | 7.4 | 6.8 | 6.5 |
| 50° · 95% × 22 hr % | 18.7 | 17.4 | 17.3 | 18.7 | 17.5 | 30.1 | 27.7 | 26.0 |

[5]Manufactured by Takeda Chemical Industries; trifunctional, hydroxyl value 35.0 mg KOH/g, viscosity 870 mPa · s.
[6]Manufactured by Takeda Chemical Industries; acrylonitrile/styrene polymer polyol, polymer content 20%, hydroxyl value 29.7 mg KOH/g, viscosity 2,000 mPa · s.
[7]Silicone manufactured by Toray Dow Corning.
[8]Catalyst manufactured by Tosoh Corp.
[9]Crosslinking agent manufactured by Takeda Chemical Industries; hydroxyl value 680 mg KOH/g, viscosity 6,300 mPa · s.
[10]TDI-80/Lupranate M-20S[11] = 80/20 mixture.
[11]Polymeric MDI manufactured by BASF.

Reference Example 1

A reactor equipped with heater and stirrer means is charged with 18.5 kg of Lupranate MI (MDI, available from BASF) and 34.5 kg of Lupranate M (MDI, BASF) at a temperature of 70°-80° C.

Then, 17.0 kg of Takelac P-21 (a diol with an OH value of 56, available from Takeda Chemical Industries) is added over 1 hour and the charge is maintained at a temperature of 70°-80° C. for 2-3 hours. Thereafter, 30 kg of Lupranate M-20 (polymeric MDI, available from Takeda-Burdisch Urethane) is added to provide a modified MDI with an amine equivalent of 159.5 and a viscosity of 102 mPa.s (25° C.).

Examples 8 and 9, and Comparative Examples 10 and 11

Table 3 shows examples of all-MDI formulation.

The formulations of Example 8 and Comparative Example 10 are substantially identical. Moreover, the two formulations are not much different in free rise foaming density. However, when mold foams are produced from these formulations in the same manner as Example 6-1, a marked difference is found in foam density. Of course, the HR foam varies in density according to the pouring volume but when the pouring volume of Comparative Example 10 is decreased, the foam does not fill up the cavity so that a foam with a density of less than 53 kg/m³ cannot be obtained.

The physical properties of the foams are shown in Table 3. The invention provides low-density, low-hardness foams with sufficiently low permanent strain values. The humid-heat permanent strain values of the foams are also less than 10%.

The above examples also indicate the effectiveness of the process of the invention.

TABLE 3

|  | Ex. 8 | Ex. 9 | Comp. Ex. 10 | Comp. Ex. 11 |
|---|---|---|---|---|
| Polyol of Example 2 | 100 | 100 |  |  |
| Actcol MF-15S[1] |  |  | 100 | 100 |
| $H_2O$ | 3.5 | 3.0 | 3.5 | 3.5 |
| CFC-11 | — | — | — | 5 |
| SZ-1313[2] | 1.0 | 1.0 | 1.0 | 1.0 |
| TEDA L-33 | 0.3 | 0.3 | 0.8 | 0.8 |
| CR-4[3] | 3.5 | 3.5 | 3.5 | 3.5 |
| Isocyanate C | 80.7 | 71.8 | 78.7 | 78.7 |
| Index (Reactivity) | 100 | 100 | 100 | 100 |
| CT sec | 4 | 5 | 8 | 8 |
| RT sec | 95 | 105 | 119 | 131 |
| Free density kg/m³ | 38.4 | 43.4 | 39.8 | 36.5 |
| Physial properties of foam |  |  |  |  |
| Overall density (kg/m³) | 49.8 | 54.6 | 54.8 | 53.3 |
| Core density (kg/m³) | 44.6 | 48.7 | 45.8 | 45.0 |
| 25% ILD (kg/314 cm²) | 13.8 | 15.4 | 19.0 | 19.6 |
| Ball Rebound (%) | 64 | 65 | 59 | 59 |
| Tensile strength (kg/cm²) | 1.24 | 1.28 | 1.23 | 1.29 |
| Tear resistance (kg/cm) | 0.64 | 0.65 | 0.61 | 0.63 |
| Elongation (%) | 108 | 107 | 104 | 106 |
| 70° C. × 22 hr | 3.8 | 3.3 | 5.4 | 6.8 |

TABLE 3-continued

|  | Ex. 8 | Ex. 9 | Comp. Ex. 10 | Comp. Ex. 11 |
|---|---|---|---|---|
| 50° · 95% × 22 hr (%) | 9.8 | 8.5 | 13.6 | 16.5 |

(1)Triol manufactured by Takeda Chemical Industries, OH value 29 mg KOH/g, viscosity 1,300 mPa · s (25° C.).
(2)Surfactant manufactured by Nippon Unicar.
(3)Crosslinking agent manufactured by Takeda Chemical Industries, OH value 850 mg KOH/g, viscosity 1,050 mPa · s (25° C.).

What is claimed is:

1. A polyether polyol obtainable by addition-polymerization of an alkylene oxide to an N-aminoethylpiperazine-ethylene oxide adduct as an initiator, said polyether polyol and having a molecular weight of about 2000 to 7000.

2. A polyether polyol according to claim 1 which has a hydroxyl value of 23 to 100 mg KOH/g.

3. A polyether polyol according to claim 1 wherein the alkylene oxide addition-polymerized is ethylene oxide and/or propylene oxide.

4. A polyether polyol according to claim 1 wherein the ethylene oxide addition-polymerized accounts for not more than 20% of the polyether polyol.

5. A polyether polyol according to claim 1 wherein the ethylene oxide directly bound to terminal hydrogen accounts for not more than 15% of the polyether polyol.

6. A polyol consisting of a polymer of an ethylenically unsaturated monomer and the polyether polyol of claim 1.

* * * * *